(12) United States Patent
Tokunaga et al.

(10) Patent No.: US 10,824,264 B2
(45) Date of Patent: Nov. 3, 2020

(54) METHODS AND SYSTEM FOR A CAPACITIVE TOUCH SENSOR

(71) Applicant: SEMICONDUCTOR COMPONENTS INDUSTRIES, LLC, Phoenix, AZ (US)

(72) Inventors: Tetsuya Tokunaga, Oura-gun (JP); Kensuke Goto, Ashikaga (JP); Hiroshi Yoshino, Oizumi-machi (JP); Yasunori Yamamoto, Oizumi-machi (JP); Takayasu Otagaki, Ota (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 60 days.

(21) Appl. No.: 16/255,953

(22) Filed: Jan. 24, 2019

(65) Prior Publication Data

US 2020/0241682 A1 Jul. 30, 2020

(51) Int. Cl.
*G06F 3/041* (2006.01)
*G01D 5/24* (2006.01)
*G06F 3/044* (2006.01)

(52) U.S. Cl.
CPC ............. *G06F 3/0416* (2013.01); *G01D 5/24* (2013.01); *G06F 3/044* (2013.01)

(58) Field of Classification Search
None
See application file for complete search history.

(56) References Cited

U.S. PATENT DOCUMENTS

| 2013/0015867 | A1 | 1/2013 | Aras |
| 2014/0375593 | A1 | 12/2014 | Singh |
| 2016/0077667 | A1* | 3/2016 | Chiang ................. G06F 1/3228 345/173 |
| 2018/0004353 | A1* | 1/2018 | Shin ........................ G06F 3/044 |
| 2018/0188847 | A1* | 7/2018 | Srivastava .............. G06F 3/044 |
| 2019/0196644 | A1* | 6/2019 | Chung ................ G06F 3/04182 |

* cited by examiner

*Primary Examiner* — Roy P Rabindranath
(74) *Attorney, Agent, or Firm* — The Noblitt Group, PLLC; Hettie L. Haines

(57) ABSTRACT

Various embodiments of the present technology may provide methods and system for a capacitive touch sensor. The system is configured to measure a capacitance of a capacitive sensor element and generate a corresponding voltage using a sensing circuit. The sensing circuit may include an amplifier configured to generate a plurality of amplified voltages by applying a set of gain values to the voltage. The sensing circuit may further analyze a set of values according to the plurality of the amplified voltages.

20 Claims, 7 Drawing Sheets

Figure 1:
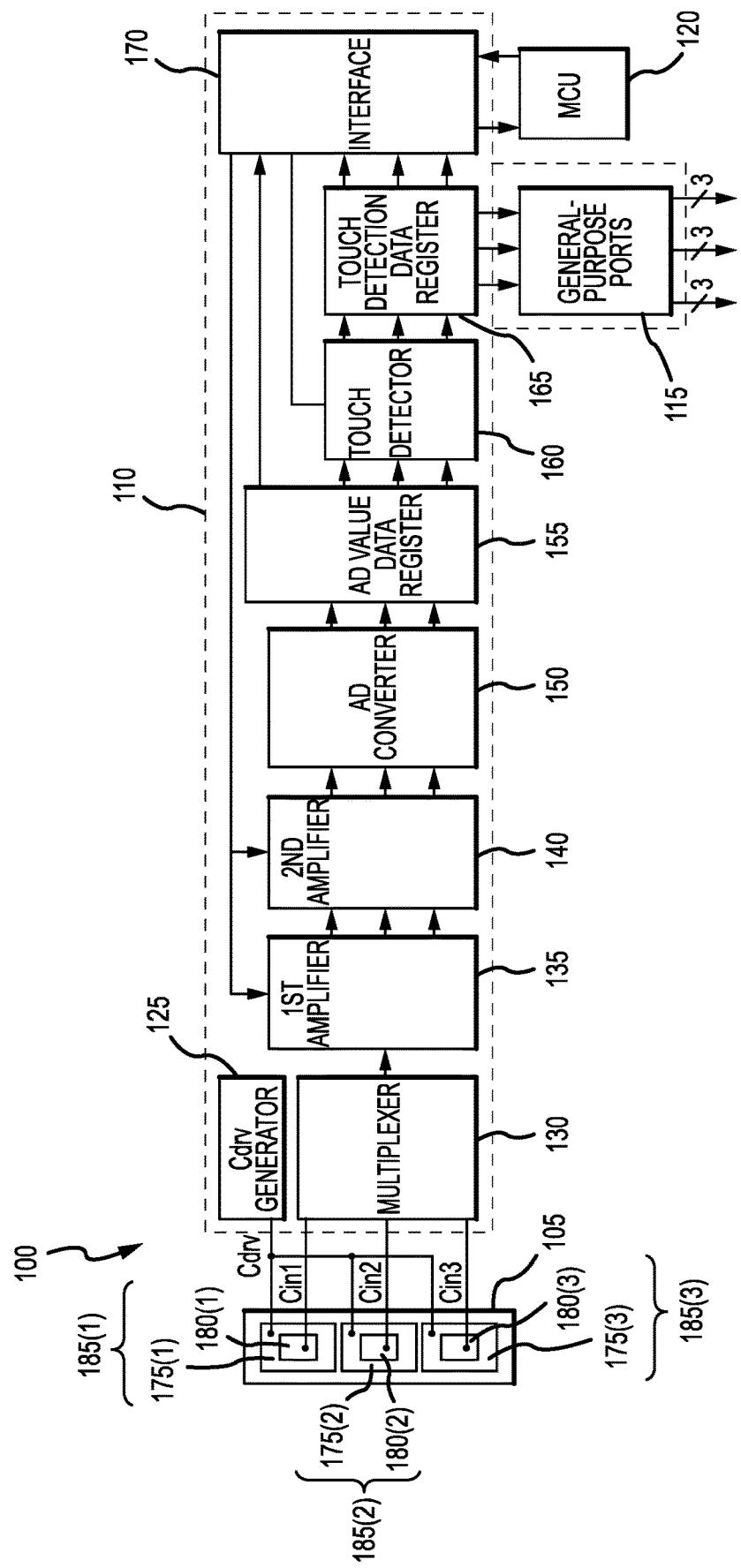

| ITEMS | Cin1-1 | Cin2-1 | Cin3-1 | COMMENTS |
|---|---|---|---|---|
| GAIN | 1 | 1 | 1 | 1ST LEVEL |
| AD VALUE | 0 | 8 | 16 | 1ST AD |
| LOGIC VALUE | 0 | 0 | 1 | 1ST DATA |
| ITEMS | Cin1-2 | Cin2-2 | Cin3-2 | COMMENTS |
| GAIN | 4 | 4 | 4 | 2ND LEVEL |
| AD VALUE | 0 | 32 | 64 | 2ND AD |
| LOGIC VALUE | 0 | 1 | 1 | 2ND DATA |
| ITEMS | Cin1-3 | Cin2-3 | Cin3-3 | COMMENTS |
| GAIN | 16 | 16 | 16 | 3RD LEVEL |
| AD VALUE | 0 | 128 | 256 | 3RD AD |
| LOGIC VALUE | 0 | 1 | 1 | 3RD DATA |

| ITEMS | Cin1-1 | Cin2-1 | Cin3-1 | COMMENTS |
|---|---|---|---|---|
| GAIN | 1 | 1 | 1 | 1ST LEVEL |
| AD VALUE | 0 | 0 | 6 | 1ST AD |
| LOGIC VALUE | 0 | 0 | 0 | 1ST DATA |
| ITEMS | Cin1-2 | Cin2-2 | Cin3-2 | COMMENTS |
| GAIN | 4 | 4 | 4 | 2ND LEVEL |
| AD VALUE | 0 | 12 | 24 | 2ND AD |
| LOGIC VALUE | 0 | 0 | 1 | 2ND DATA |
| ITEMS | Cin1-3 | Cin2-3 | Cin3-3 | COMMENTS |
| GAIN | 16 | 16 | 16 | 3RD LEVEL |
| AD VALUE | 0 | 48 | 96 | 3RD AD |
| LOGIC VALUE | 0 | 1 | 1 | 3RD DATA |

| ITEMS | Cin1-1 | Cin2-1 | Cin3-1 | COMMENTS |
|---|---|---|---|---|
| GAIN | 1 | 1 | 1 | 1ST LEVEL |
| AD VALUE | 0 | 0 | 1 | 1ST AD |
| LOGIC VALUE | 0 | 0 | 0 | 1ST DATA |
| ITEMS | Cin1-2 | Cin2-2 | Cin3-2 | COMMENTS |
| GAIN | 4 | 4 | 4 | 2ND LEVEL |
| AD VALUE | 0 | 2 | 4 | 2ND AD |
| LOGIC VALUE | 0 | 0 | 0 | 2ND DATA |
| ITEMS | Cin1-3 | Cin2-3 | Cin3-3 | COMMENTS |
| GAIN | 16 | 16 | 16 | 3RD LEVEL |
| AD VALUE | 0 | 8 | 16 | 3RD AD |
| LOGIC VALUE | 0 | 1 | 1 | 3RD DATA | ns, capacitors, and the like, which may carry out a
METHODS AND SYSTEM FOR A CAPACITIVE TOUCH SENSOR

BACKGROUND OF THE TECHNOLOGY

Capacitive sensors operate by detecting changes in the capacitance formed between a transmission electrode and a sense electrode. The degree of change in the capacitance may indicate various conditions, such as proximity, touch, pressure, and the like.

In general, a sensing circuit is connected to the capacitive sensor to measure and/or detect the capacitance of the capacitive sensor. Conventional sensing circuits may process the detection data in manner that may result in inaccurate touch or sensing information.

SUMMARY OF THE INVENTION

Various embodiments of the present technology may provide methods and system for a capacitive touch sensor. The system is configured to measure a capacitance of a capacitive sensor element and generate a corresponding voltage using a sensing circuit. The sensing circuit may include an amplifier configured to generate a plurality of amplified voltages by applying a set of gain values to the voltage. The sensing circuit may further analyze a set of values according to the plurality of the amplified voltages.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

Figures 2, 3:
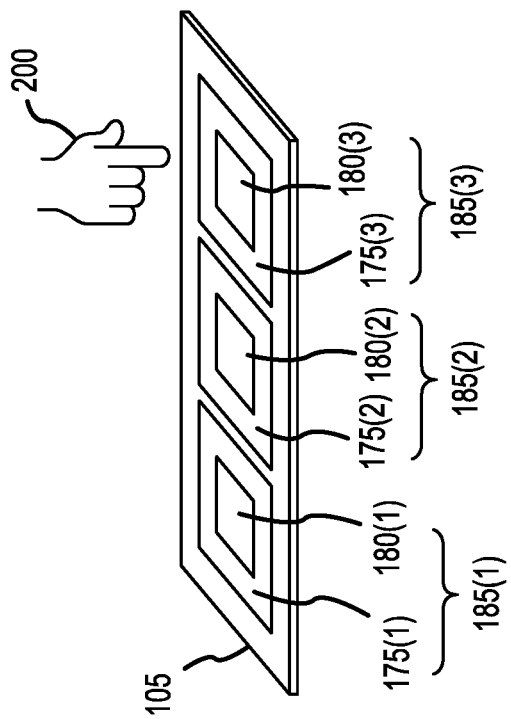
Figures 4, 5:
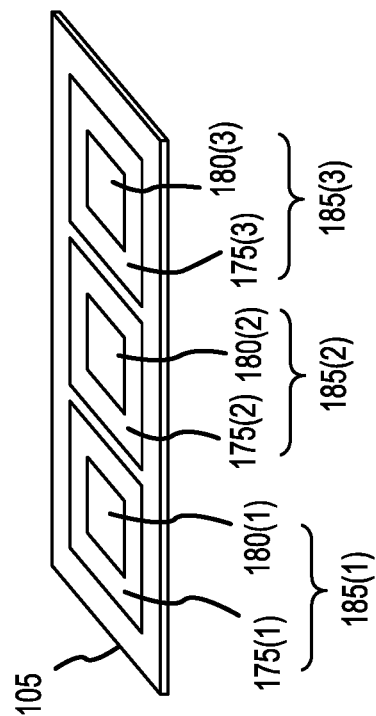
Figures 6, 7:
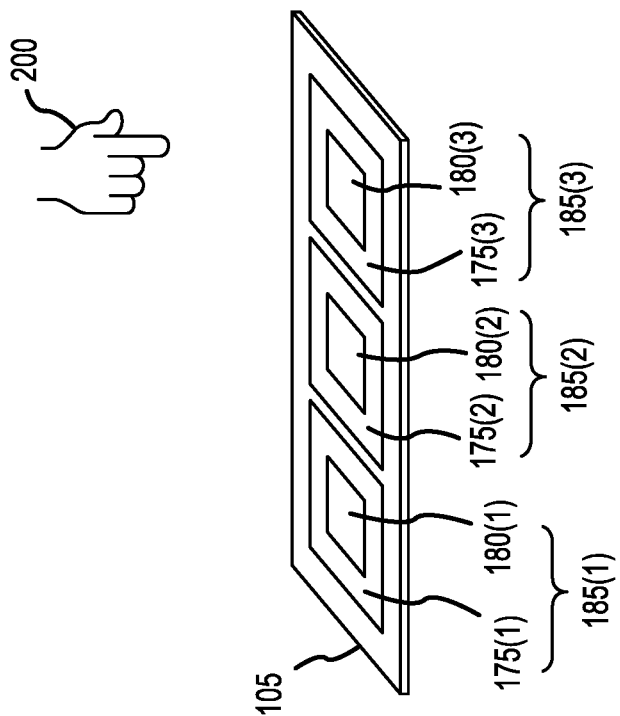
Figure 8:
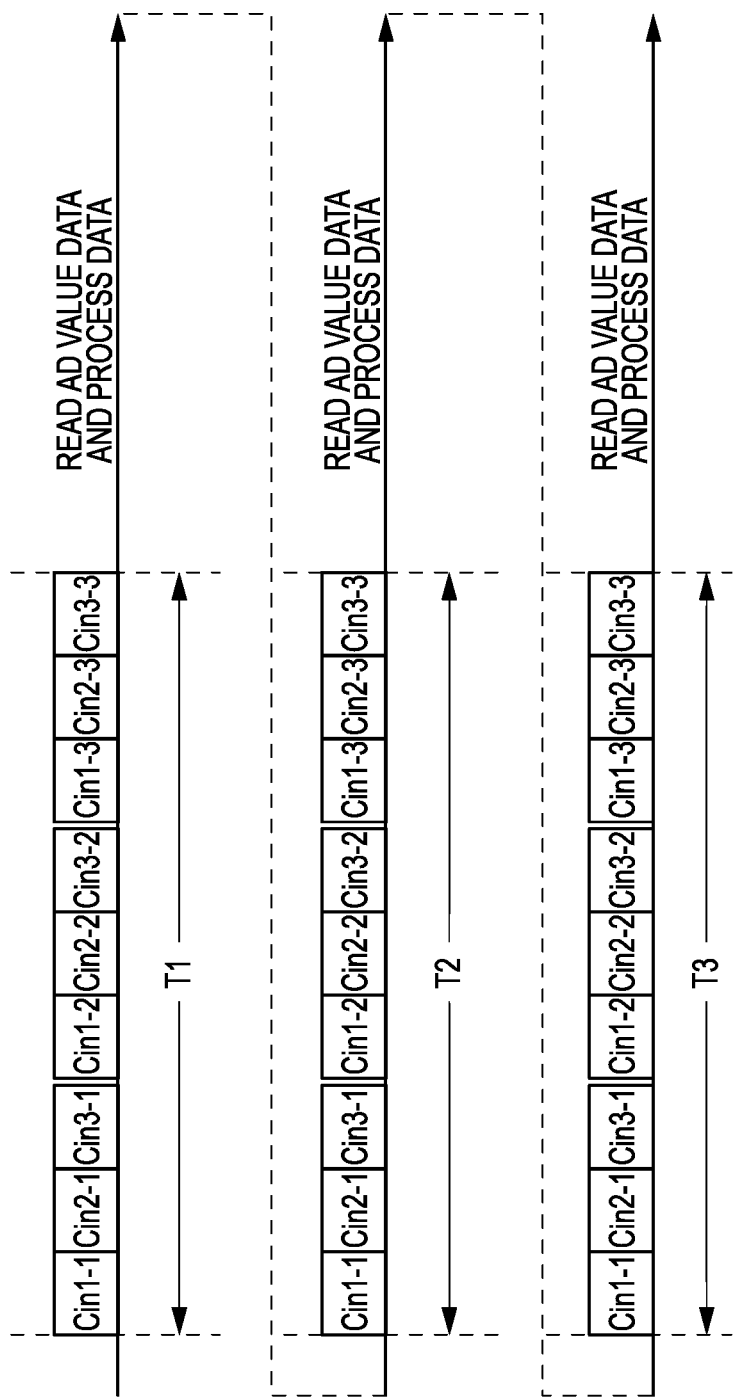
Figure 9:
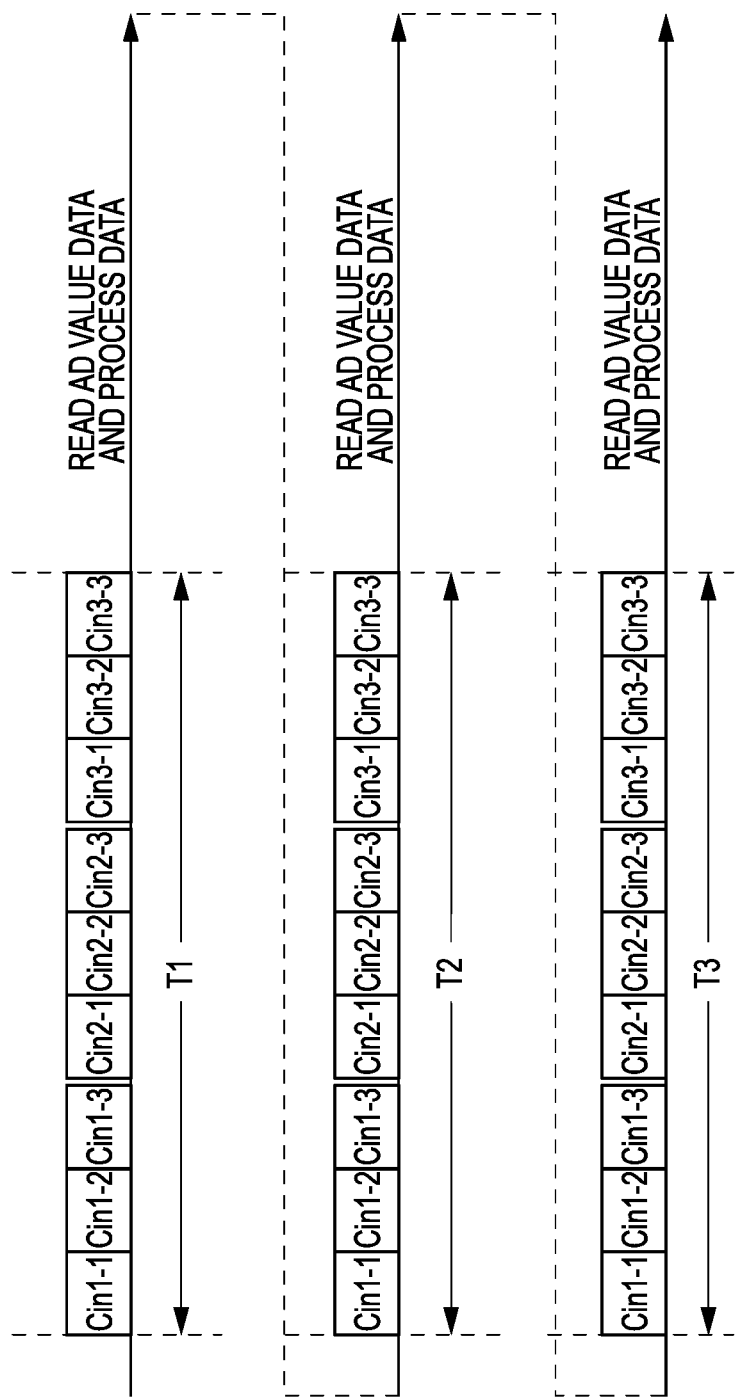
Figure 10:
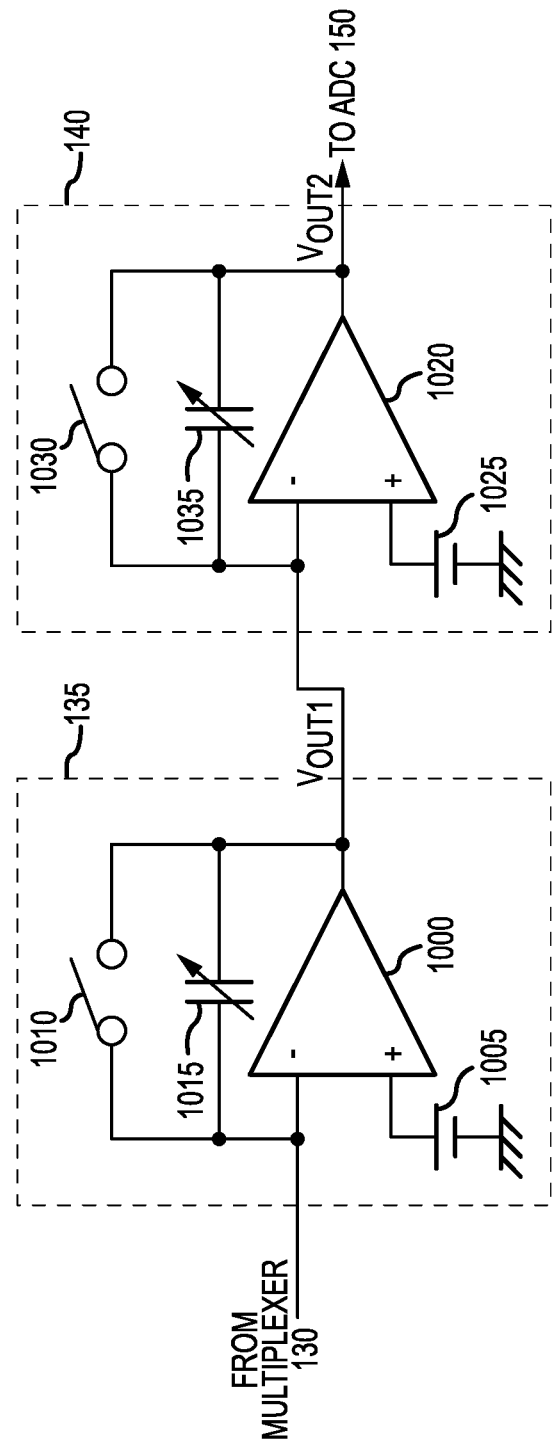

FIG. 1 representatively illustrates a touch sensor system in accordance with an exemplary embodiment of the present technology;

FIG. 2 representatively illustrates an object at a first position relative to a touch sensor in accordance with the present technology;

FIG. 3 is a data chart with example data provided by a sensing circuit when the object is at the first position and in accordance with the present technology;

FIG. 4 representatively illustrates the object at a second position relative to the touch sensor in accordance with the present technology;

FIG. 5 is a data chart with example data provided by the sensing circuit when the object is at the second position and in accordance with the present technology;

FIG. 6 representatively illustrates the object at a third position relative to the touch sensor in accordance with the present technology;

FIG. 7 is a data chart with example data provided by the sensing circuit when the object is at the third position and in accordance with the present technology;

FIG. 8 representatively illustrates a processing method of the sensing circuit in accordance with the present technology;

FIG. 9 representatively illustrates an alternative processing method of the sensing circuit in accordance with the present technology; and FIG. 10 is a circuit diagram of a first amplifier and a second amplifier of the sensing circuit in accordance with the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various controllers, amplifiers, signal converters, drivers, switching devices, current sources, voltage sources, logic gates, semiconductor devices, such as transistors, capacitors, and the like, which may carry out a variety of functions. In addition, the present technology may be integrated in any number of electronic systems, such as automotive, aviation, "smart devices," portables, "white goods," and consumer electronics, and the systems described are merely exemplary applications for the technology.

Referring to FIGS. 1, 2, and 10, an exemplary touch sensor system 100 may be integrated in a cell phone to detect proximity, gestures, touch, pressure, and the like. In an exemplary embodiment, the touch sensor system 100 may comprise a touch sensor 105, a sensing circuit 110, and a processing circuit 120.

The touch sensor 105 may be configured to detect an object 200, such as a hand or finger. For example, the touch sensor 105 may operate in conjunction with the sensing circuit 110 to determine a position, a proximity, a gesture, and/or an applied pressure of the object.

According to an exemplary embodiment, the touch sensor 105 may comprise a plurality of capacitive elements 185, such as a first capacitive element 185(1), a second capacitive element 185(2), and a third capacitive element 185(3). Each capacitive element 185 may be configured as a mutual capacitance sensor and may comprise a first electrode 175 in communication with a second electrode 180.

The first and second electrodes 175, 180 may be configured to form an electric field, wherein a capacitance of the capacitive element 185 is proportional to the electric field. For example, one electrode may operate as a drive electrode while the remaining electrode may operate as a reception electrode. The first and second electrodes 175, 180 may be formed using a conductive material, such as metal. Either one of the first and second electrodes 175, 180 may be connected to a power source 125 that generates a drive signal Cdrv. The drive signal Cdrv may pulse between two voltage levels. Accordingly, the electrode that is connected to the power source 125 may be referred to as the drive electrode and the remaining electrode may be referred to as the reception electrode.

In an exemplary embodiment, the first and second electrodes 175, 180 may be arranged as concentric squares, circles, or any other suitable shape, and the first and second electrodes 175, 180 may be planar with each other. In other words, the second electrode 180 may be nested within the first electrode 175. The first and second electrodes 175, 180 may be formed on a flexible substrate, such as a plastic material, or a rigid substrate, such as a printed circuit board.

The sensing circuit 110 may be responsive to the electric field and/or configured to measure the capacitance and/or a change in capacitance of each capacitive element 185. For example, the sensing circuit 110 responds to a first capacitance Cin1 associated with the first capacitive element 185(1), a second capacitance Cin2 associated with the second capacitive element 185(2), and a third capacitance Cin3 associated with the third capacitive element 185(3). When the object 200 approaches the capacitive element 185, the object 200 disturbs the electric field which causes a change to a resting capacitance.

The sensing circuit 110 may be further configured to perform various functions, such as amplification, signal conversion, analysis and the like. For example, the sensing circuit 110 may comprise a first amplifier circuit 135, a second amplifier circuit 140, an analog-to-digital converter (ADC) 150, and a detection circuit 160. The sensing circuit 110 may further comprise various circuits and/or devices for transmitting and/or storing data. For example, the sensing circuit 110 may comprise a multiplexer 130, a first register 155, and a second register 165.

The multiplexer 130 may be connected to the touch sensor 105 to receive a plurality of input signals from the capacitive elements 185 (e.g., Cin1, Cin2, Cin3). For example, each capacitive element 185 may generate an input signal and be separately (individually) connected to the multiplexer 130. The multiplexer 130 may selectively transmit one signal from the plurality of input signals to the first amplifier circuit 135. The multiplexer 130 may comprise any suitable multiplexer circuit with multiple input terminals and at least one output terminal.

The first amplifier circuit 135 may be configured to measure the capacitance and/or detect changes in the capacitance and convert the capacitance (e.g., Cin1, Cin2, Cin3) to a voltage. For example, the first amplifier circuit 135 may comprise a first differential amplifier 1000 comprising an inverting terminal (−) connected to the multiplexer 130 and a non-inverting terminal (+) connected to a reference voltage, such as supplied by a first voltage source 1005. The first differential amplifier 1000 may be configured to measure a voltage difference between the inverting and non-inverting terminals. The first differential amplifier 1000 may also be configured to amplify a signal by applying a gain to the voltage difference and generate a first output voltage $V_{OUT1}$ according to the voltage difference and/or the applied gain.

The second amplifier circuit 140 may be configured to amplify a signal. The second amplifier circuit 140 may be connected to an output terminal of the first amplifier circuit 135 and configured to apply a gain to the first output voltage $V_{OUT1}$ and generate a second output voltage $V_{OUT2}$ according to the applied gain. The second amplifier circuit 140 may comprise a second differential amplifier 1020 comprising an inverting terminal (−) connected to the output terminal of the first amplifier circuit 135 and a non-inverting terminal (+) connected to a reference voltage, such as supplied by a second voltage source 1025. The first and second voltage sources 1005, 1025 may supply a same voltage, such as 0.5 V.

The ADC 150 may be connected to an output terminal of the second amplifier circuit 140 and configured to convert a voltage, such as the second output voltage $V_{OUT2}$, to a digital value (i.e., AD value). According to various embodiments, as the capacitance of the capacitive element 185 decreases, the corresponding digital value increases and vice versa. The ADC 150 may comprise any signal converter suitable for converting an analog signal to a digital signal.

The ADC 150 may transmit the digital value to the first register 155, wherein the first register 155 stores the digital value. The first register 155 may comprise any memory device suitable for storing data, digital values, and the like.

The detection circuit 160 may receive the digital value from the ADC 150 via the first register 155 and interpret the digital value. According to various embodiments, the detection circuit 160 may be programmed with a predetermined threshold that corresponds to a particular digital value. The detection circuit 160 may utilize the predetermined threshold to determine whether a touch event (e.g., actual contact between the object 200 and the capacitive element 185 and/or disturbances of the electric field by the object 200), has occurred. For example, the detection circuit 160 may compare the digital value from the ADC 150 with the predetermined threshold and generate a logic signal corresponding to the comparison. The logic signal may have a first value (e.g., a logic '0' value) if the digital value is less than the predetermined threshold and may have a second value (e.g., a logic '1' value) if the digital value is greater than or equal to the predetermined threshold. The first value may indicate an absence of a touch event and the second value may indicate a presence of a touch event. The detection circuit 160 may comprise any number of circuits, logic gates, and the like, that operate together to analyze the digital value.

The detection circuit 160 may transmit the logic value to a second register 165, wherein the second register 165 stores the logic value. The second register 165 may comprise any memory device suitable for storing data, digital values, and the like.

The touch sensor system 100 may further comprise an interface 170 configured to communicate with the processing circuit 120. For example, the interface may be configured to send and/or receive data and/or other control information from the processing circuit 120, such as touch detection data, gain control information, threshold information, and the like.

The interface 170 may be further configured to control the gain of the first and second amplifier circuits 135, 140. For example, the interface 170 may generate various signals corresponding to various gain values and supply the desired signals to the first and second amplifier circuits 135, 140 based on the desired amplification level.

The interface 170 may further communicate with the first register 155, such as receiving data from the first register 155. The interface 170 may further control the detection circuit 160, such as by setting one or more predetermined thresholds used to determine whether a touch event has occurred.

The touch sensor system 100 may further comprise a set of ports 115 used to transmit data to another device and/or a companion circuit. The set of ports 115 may be configured as general purpose ports to transmit digital data. The set of ports 115 may be formed on a same chip as the sensing circuit 110 or may be formed on a separate chip.

The processing circuit 120 may be configured to analyze a set of logic values and determine at least one of a position and a proximity of the object 200 in relation to the touch sensor 105 and/or particular capacitive elements 185(1):185(3). For example, the processing circuit 120 may utilize the set of logic values to determine which capacitive element 185 is closest to the object 200. The processing circuit 120 may also estimate the object's distance from a surface of the touch sensor 105 and/or a particular capacitive element 185. The processing circuit 120 may comprise various circuits and/or devices suitable for analyzing the set of logic values in combination with each other, such as a microcontroller (MCU).

Referring to FIGS. 1-9, in operation, the touch sensor system 100 measures the capacitance of each capacitive element 185, converts the capacitance into a voltage, applies multiple gain values to the voltage values, and analyzes the amplified voltages to determine at least one of the position or the proximity of the object 200 relative to the capacitive elements 185 of the touch sensor 105.

According to an exemplary embodiment, the touch sensor comprises the first, second, and third capacitive elements 185(1), 185(2), 185(3). In operation, each capacitive element 185 generates an electric field, and therefore, each capacitive element 185 generates a corresponding capacitance and input signal (e.g., Cin1, Cin2, Cin3). The input signal for each capacitive element 185 may be transmitted to the sensing circuit 110, and in particular to the multiplexer 130. The multiplexer 130 may then sequentially transmit each input signal to the first amplifier circuit 135.

The first amplifier circuit 135 converts the input signal (capacitance) to the first output voltage $V_{OUT1}$ and transmits the first output voltage $V_{OUT1}$ to the second amplifier circuit 140.

In a first operation, and referring to FIGS. 2-7 and 8, the sensing circuit 110 processes the data in a first manner. During a first time period T1, and referring to FIGS. 2, 3, and 8, the second amplifier circuit 140 receives first output voltages $V_{OUT1}$ from the first amplifier circuit 135. For example, the second amplifier circuit 140 receives an output voltage from the first capacitive element 185(1) ($V_{OUT1\_Cin1}$), an output voltage from the second capacitive element 185(2) ($V_{OUT1\_Cin2}$), and an output voltage from the third capacitive element 185(3) ($V_{OUT1\_Cin3}$) in sequence. As each output voltage is transmitted, the second amplifier circuit 140 applies a first gain value ($1^{st}$ level gain) to the output voltage from the first capacitive element 185(1) ($V_{OUT1\_Cin1}$), applies the first gain value to the output voltage from the second capacitive element 185(2) ($V_{OUT1\_Cin2}$), and applies the first gain value to the output voltage from the third capacitive element 185(3) ($V_{OUT1\_Cin3}$). Accordingly, the second amplifier circuit 140 generates first, second, and third amplified voltages (e.g., $V_{OUT2\_1}$, $V_{OUT2\_2}$, $V_{OUT2\_3}$), one for each capacitive element 185.

The second amplifier circuit 140 then applies a second gain value ($2^{nd}$ level gain) to each output voltage from each capacitive element 185. For example, the second amplifier circuit 140 applies the second gain value to the output voltage from the first capacitive element 185(1) ($V_{OUT1\_Cin1}$), applies the second gain value to the output voltage from the second capacitive element 185(2) ($V_{OUT1\_Cin2}$), and applies the second gain value to the output voltage from the third capacitive element 185(3) ($V_{OUT1\_Cin3}$). Accordingly, the second amplifier circuit 140 generates fourth, fifth, and sixth amplified voltages (e.g., $V_{OUT2\_4}$, $V_{OUT2\_5}$, $V_{OUT2\_6}$), one for each capacitive element 185.

The second amplifier circuit 140 then applies a third gain value ($3^{rd}$ level gain) to each output voltage from each capacitive element 185. For example, the second amplifier circuit 140 applies the third gain value to the output voltage from the first capacitive element 185(1) ($V_{OUT1\_Cin1}$), applies the third gain value to the output voltage from the second capacitive element 185(2) ($V_{OUT1\_Cin2}$), and applies the third gain value to the output voltage from the third capacitive element 185(3) ($V_{OUT1\_Cin3}$). Accordingly, the second amplifier circuit 140 generates seventh, eight, and ninth amplified voltages (e.g., $V_{OUT2\_7}$, $V_{OUT2\_8}$, $V_{OUT2\_9}$), one for each capacitive element 185.

The ADC 150 may then convert the first through the ninth amplified voltages (e.g., $V_{OUT2\_1}$, $V_{OUT2\_2}$, $V_{OUT2\_3}$, $V_{OUT2\_4}$, $V_{OUT2\_5}$, $V_{OUT2\_6}$, $V_{OUT2\_7}$, $V_{OUT2\_8}$, $V_{OUT2\_9}$) and process them as a set, thereby generating nine corresponding digital values. The detection circuit 160 may further determine if each of the first through ninth amplified voltages and/or corresponding digital values is greater than or equal to the predetermined threshold value and generate a logic value (e.g., a logic '0' or a logic '1') for each amplified voltage or digital value, resulting in a set of logic values (i.e. touch detection data). In an exemplary operation, a logic '1' value corresponds to a touch event and a logic '0' value corresponds to a non-touch event. The set of logic values may be transmitted and stored in the second register 165.

The processing circuit 120 may then receive or retrieve the set logic values from the second register 165, via the interface 170, and analyze the set of logic values. The processing circuit 120 may be configured to determine which capacitive element 185 is closest to the object 200 (i.e., a position of the object 200 relative to the touch sensor 105 and/or capacitive element 185) at a particular time and/or the object's distance (i.e., a proximity of the object 200 relative to the touch sensor 105 and/or capacitive element 185) from a particular capacitive element 185. For example, and referring to FIGS. 2 and 3, the third capacitive element 185(3) generates a logic value '1' for each gain level (i.e., $1^{st}$, $2^{nd}$, and $3^{rd}$ levels), the second capacitive element 185(2) generates a logic value '1' for only two of the three gain levels (i.e., $2^{nd}$ and $3^{rd}$ levels), and the first capacitive element generates a logic value '0' for each gain level (i.e., $1^{st}$, $2^{nd}$, and $3^{rd}$ levels). Based on this pattern of logic values, the processing circuit 120 may determine that the object 200 is closest to the third capacitive element 185(3), since the third capacitive element 185(3) generated the most number of logic '1' values across the three gain levels.

During a second time period T2, and referring to FIGS. 4 and 5, as the object 200 moves away from the touch sensor 105, the sensing circuit 110 and processing circuit 120 may process a new set of data in the same manner as described above.

During a third time period T3, and referring to FIGS. 6 and 7, as the object 200 moves even further away from the touch sensor 105, the sensing circuit 110 and processing circuit 120 may process a new set of data in the same manner as described above.

In a second operation, and referring to FIGS. 2-7 and 9, the sensing circuit 110 processes the data in a second manner. During a first time period T1, and referring to FIGS. 2, 3, and 9, the second amplifier circuit 140 receives first output voltages $V_{OUT1}$ from the first amplifier circuit 135. For example, the second amplifier circuit 140 applies a first gain value ($1^{st}$ level gain) to the output voltage from the first capacitive element 185(1) ($V_{OUT1\_Cin1}$), applies a second gain value ($2^{nd}$ level gain) to the output voltage from the first capacitive element 185(1) ($V_{OUT1\_Cin1}$), and applies a third gain value ($3^{rd}$ level gain) to the output voltage from the first capacitive element 185(1) ($V_{OUT1\_Cin1}$). Accordingly, the second amplifier circuit 140 generates first, second, and third amplified voltages (e.g., $V_{OUT2\_1}$, $V_{OUT2\_2}$, $V_{OUT2\_3}$), one for each gain level applied to output voltage $V_{OUT1\_Cin1}$.

The second amplifier circuit 140 then applies the first gain value to the output voltage from the second capacitive element 185(2) ($V_{OUT1\_Cin2}$), applies the second gain value to the output voltage from the second capacitive element 185(2) ($V_{OUT1\_Cin2}$), and applies the third gain value to the output voltage from the second capacitive element 185(2) ($V_{OUT1\_Cin2}$). Accordingly, the second amplifier circuit 140 generates fourth, fifth, and sixth amplified voltages (e.g., $V_{OUT2\_4}$, $V_{OUT2\_5}$, $V_{OUT2\_6}$), one for each gain level applied to the output voltage $V_{OUT1\_Cin2}$.

The second amplifier circuit 140 then applies the first gain value to the output voltage from the third capacitive element 185(3) ($V_{OUT1\_Cin3}$), applies the second gain value to the output voltage from the third capacitive element 185(3) ($V_{OUT1\_Cin3}$), and applies the third gain value to the output voltage from the third capacitive element 185(3) ($V_{OUT1\_Cin3}$). Accordingly, the second amplifier circuit 140 generates seventh, eight, and ninth amplified voltages (e.g. $V_{OUT2\_7}$, $V_{OUT2\_8}$, $V_{OUT2\_9}$), one for each gain level applied to the output voltage $V_{OUT1\_Cin3}$.

The ADC 150 may then convert the first through the ninth amplified voltages (e.g., $V_{OUT2\_1}$, $V_{OUT2\_2}$, $V_{OUT2\_3}$, $V_{OUT2\_4}$, $V_{OUT2\_5}$, $V_{OUT2\_6}$, $V_{OUT2\_7}$, $V_{OUT2\_8}$, $V_{OUT2\_9}$) and process them as a set, thereby generating nine corresponding digital values. The detection circuit 160 may further determine if each of the first through ninth amplified voltages and/or digital values is above the predetermined threshold value and generate a logic value (e.g., a logic '0' or a logic '1') for each amplified voltage or digital value, resulting in a set of logic values. In an exemplary operation, a logic '1' value corresponds to a touch event and a logic '0' value corresponds to a non-touch event. The set of logic values may be transmitted and stored in the second register 165.

The processing circuit 120 may then receive or retrieve the set logic values from the second register 165, via the interface 170, and analyze the set of logic values. The processing circuit 120 may be configured to determine which capacitive element 185 is closest to the object 200 (i.e., a position of the object 200 relative to the touch sensor 105 and/or capacitive element 185) at a particular time and/or the object's distance (i.e., a proximity of the object 200 relative to the touch sensor 105 and/or capacitive element 185) from a particular capacitive element 185. For example, and referring to FIGS. 2 and 3, the third capacitive element 185(3) generates a logic value '1' for each gain level (i.e., $1^{st}$, $2^{nd}$, and $3^{rd}$ levels), the second capacitive element 185(2) generates a logic value '1' for only two of the three gain levels (i.e., $2^{nd}$ and $3^{rd}$ levels), and the first capacitive element generates a logic value '0' for each gain level (i.e., $1^{st}$, $2^{nd}$, and $3^{rd}$ levels). Based on this pattern of logic values, the processing circuit 120 may determine that the object 200 is closest to the third capacitive element 185(3), since the third capacitive element 185(3) generated the most number of logic '1' values across all gain levels.

During a second time period T2, and referring to FIGS. 4, 5, and 9, as the object 200 moves away from the touch sensor 105, the sensing circuit 110 and processing circuit 120 may process a new set of data in the same manner as described above.

During a third time period T3, and referring to FIGS. 6, 7, and 9, as the object 200 moves even further away from the touch sensor 105, the sensing circuit 110 and processing circuit 120 may process a new set of data in the same manner as described above.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A touch sensor, comprising:
  a capacitive sensor element comprising:
    a drive electrode; and
    a reception electrode configured to form a capacitance with the first electrode; and
  a sensing circuit connected to the capacitive sensor element and comprising:
    a control circuit configured to generate a gain signal;
    a first amplifier circuit configured to convert the capacitance to one particular voltage value; and
    a second amplifier circuit connected to an output terminal of the first amplifier circuit, wherein the second amplifier circuit:
      is responsive to the gain signal;
      provides a first variable gain; and
      generates a plurality of amplified voltage values using the one particular voltage value, comprising applying a first set of gain values to the one particular voltage value according to the gain signal.

2. The touch sensor according to claim 1, wherein the first amplifier circuit:
is responsive to the gain signal;
provides a second variable gain; and
applies a second set of gain values to the one particular voltage value according to the gain signal.

3. The touch sensor according to claim 2, wherein:
the first amplifier circuit comprises a first variable capacitor to provide the second variable gain; and
the second amplifier circuit comprises a second variable capacitor to provide the first variable gain.

4. The touch sensor according to claim 1, wherein the sensing circuit further comprises an analog-to-digital converter (ADC) connected to an output terminal of the second amplifier, wherein the ADC is configured to generate a plurality of digital signals based on the plurality of amplified voltage values.

5. The touch sensor according to claim 4, wherein the sensing circuit further comprises a detection circuit connected to an output terminal of the ADC and configured to compare each digital signal from the plurality of digital signals to a threshold value.

6. The touch sensor according to claim 5, wherein the detection circuit generates a logic value according to the comparisons, wherein the logic value comprises a logic '0' value and a logic '1' value.

7. The touch sensor according to claim 1, wherein the sensing circuit consecutively applies the first set of gain values to the voltage value during a first time period.

8. A method for detecting an object using a capacitive sensor, comprising:
measuring a capacitance of the capacitive sensor;
converting the capacitance to one particular voltage value;
applying a set of gain values to the one particular voltage value to generate a plurality of amplified voltages values;
converting the plurality of amplified voltages values to a plurality of digital values, wherein each amplified voltage value from the plurality of amplified voltage values has a corresponding digital value from the plurality of digital values;
generating a plurality of logic values based on a comparison of each digital value from the plurality of digital values to a threshold value; and
analyzing the plurality of logic values to determine at least one of a position and a proximity of the object.

9. The method according to claim 8, wherein the capacitive sensor comprises:
a drive electrode connected to a power source; and
a reception electrode configured to form an electric field with the drive electrode.

10. The method according to claim 8, wherein each digital value comprises a plurality of bits.

11. The method according to claim 8, wherein each logic value from the plurality of logic values comprises:
a logic '0' value; and
a logic '1' value.

12. The method according to claim 8, wherein applying the set of gain values comprises consecutively applying the set of gain values during a first time period.

13. The method according to claim 12, wherein analyzing the plurality of logic values comprises analyzing the combination of all the logic values from the plurality of logic values after the first time period.

14. A touch sensor system capable of detecting an object, comprising:
a touch sensor comprising a plurality of capacitive elements, wherein:
a first capacitive element from the plurality of capacitive elements comprises:
a first drive electrode; and
a first reception electrode configured to form a first electric field with the first drive electrode; and
a second capacitive element from the plurality of capacitive elements comprises:
a second drive electrode; and
a second reception electrode configured to form a second electric field with the second drive electrode;
a sensing circuit connected to the touch sensor and configured to:
measure a first capacitance of the first capacitive element;
measure a second capacitance of the second capacitive element;
convert the first capacitance to one particular first voltage value;
convert the second capacitance to one particular second voltage value; and
generate detection data comprising:
generating a plurality of first amplified voltage values using the one particular first voltage value, comprising applying a first set of gain values to the one particular first voltage value; and
generating a plurality of second amplified voltage values using the one particular second voltage value, comprising applying a second set of gain values to the one particular second voltage value; and
a processing circuit configured to determine at least one of a position and a proximity of the object relative to the first capacitive element and the second capacitive element according to the plurality of first amplified voltage values and the plurality of second amplified voltage values.

15. The touch sensor system according to claim 14, wherein the sensing circuit is further configured to:
convert the one particular first voltage value to a first digital value; and
convert the one particular second voltage value to a second digital value.

16. The touch sensor system according to claim 15, wherein the sensing circuit is further configured to:
perform a first comparison comprising comparing the first digital value to a threshold value; and
perform a second comparison comprising comparing the second digital value to the threshold value.

17. The touch sensor system according to claim 16, wherein the sensing circuit is further configured to generate a set of logic values according to the first and second comparisons.

18. The touch sensor system according to claim 17, wherein the processing circuit processes the set of logic values as a group to determine the at least one of the position and the proximity.

19. The touch sensor system according claim 14, wherein the sensing circuit consecutively applies the first and second set of gain values during a first time period.

20. The touch sensor system according to claim 14, wherein the sensing circuit comprises:
a first amplifier to convert:

the first capacitance to the one particular first voltage value; and the second capacitance to the one particular second voltage value; and a second amplifier connected to an output terminal of the first amplifier to apply:

the first set of gain values to the one particular first voltage value; and the second set of gain values to the one particular second voltage value.

* * * * *

UNITED STATES PATENT AND TRADEMARK OFFICE
CERTIFICATE OF CORRECTION

PATENT NO. : 10,824,264 B2
APPLICATION NO. : 16/255953
DATED : November 3, 2020
INVENTOR(S) : Tetsuya Tokunaga et al.

Page 1 of 1

It is certified that error appears in the above-identified patent and that said Letters Patent is hereby corrected as shown below:

In the Claims

In Column 9, Line 40, delete "voltages" and insert -- voltage --, therefor.

Signed and Sealed this
Twenty-fourth Day of January, 2023

Katherine Kelly Vidal
*Director of the United States Patent and Trademark Office*